(12) United States Patent
Chang

(10) Patent No.: US 6,935,740 B1
(45) Date of Patent: Aug. 30, 2005

(54) GLASSES STRUCTURE

(75) Inventor: Antony Chang, Taipei (TW)

(73) Assignees: Anthony Chang, Taipei (TW); G-M Optical Manufacturing, Inc., Taipei (TW)

( * ) Notice: Subject to any disclaimer, the term of this patent is extended or adjusted under 35 U.S.C. 154(b) by 0 days.

(21) Appl. No.: 10/805,253

(22) Filed: Mar. 22, 2004

(51) Int. Cl.⁷ .............................................. G02C 5/22
(52) U.S. Cl. ......................... 351/153; 351/106; 16/228
(58) Field of Search ............................. 351/153, 106, 351/140, 111, 110, 113, 114, 103, 41; 16/228, 16/373

(56) References Cited

U.S. PATENT DOCUMENTS 5,732,444 A * 3/1998 Horikawa et al. ............ 16/228
5,894,336 A * 4/1999 Baldissarutti ............... 351/153
6,050,685 A * 4/2000 Lin ............................. 351/110
6,412,944 B1 * 7/2002 Huang et al. ............... 351/153

* cited by examiner

Primary Examiner—Hung Xuan Dang
(74) Attorney, Agent, or Firm—Troxell Law Office, PLL

(57) ABSTRACT

A glasses structure has a lens frame and a temple. The lens frame has a curved portion disposed at a side thereof and a shaft portion downwardly extending from the curved portion. The temple has a positioning portion disposed at an end thereof, a position opening defined inside the positioning portion, a bushing portion downwardly extending from the positioning portion and a hole defined inside the bushing portion. The shaft portion of the lens frame is inserted into the hole of the temple and the curved portion of the lens frame is held in the position opening of the temple so that the temple pivots on the lens frame.

7 Claims, 6 Drawing Sheets

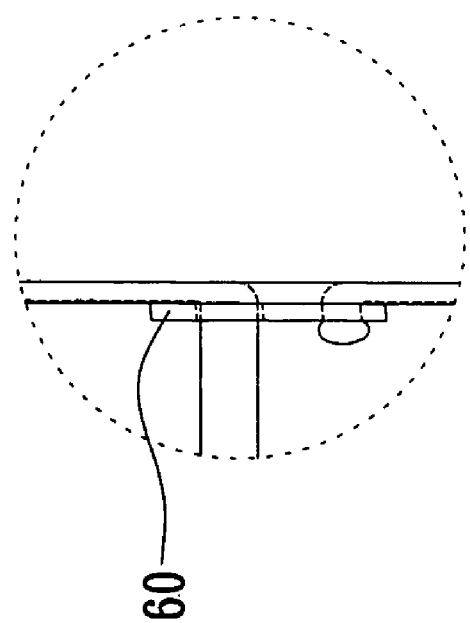
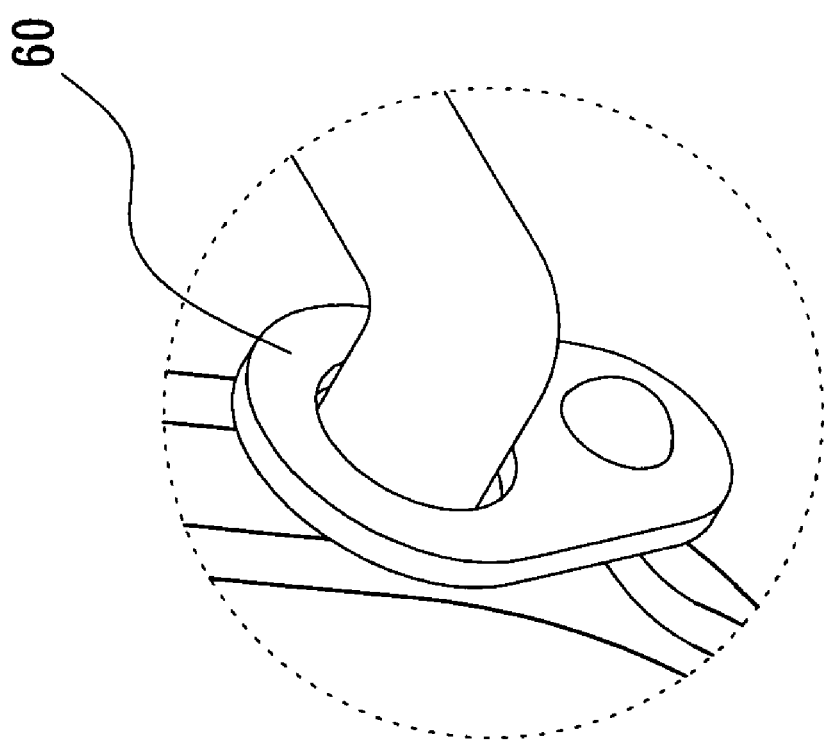
FIG. 2B
FIG. 2A

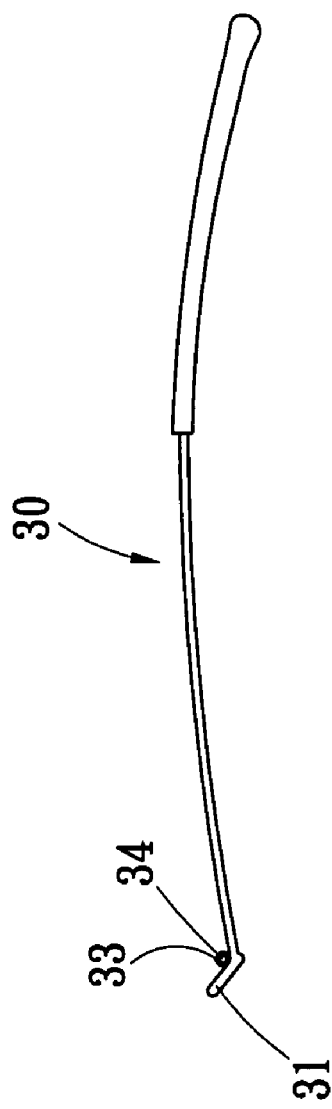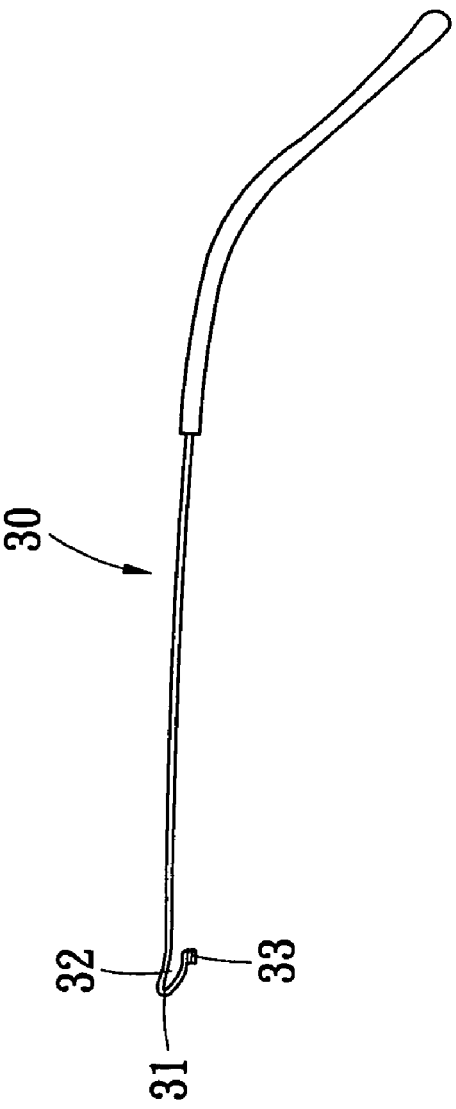
FIG. 3
FIG. 4

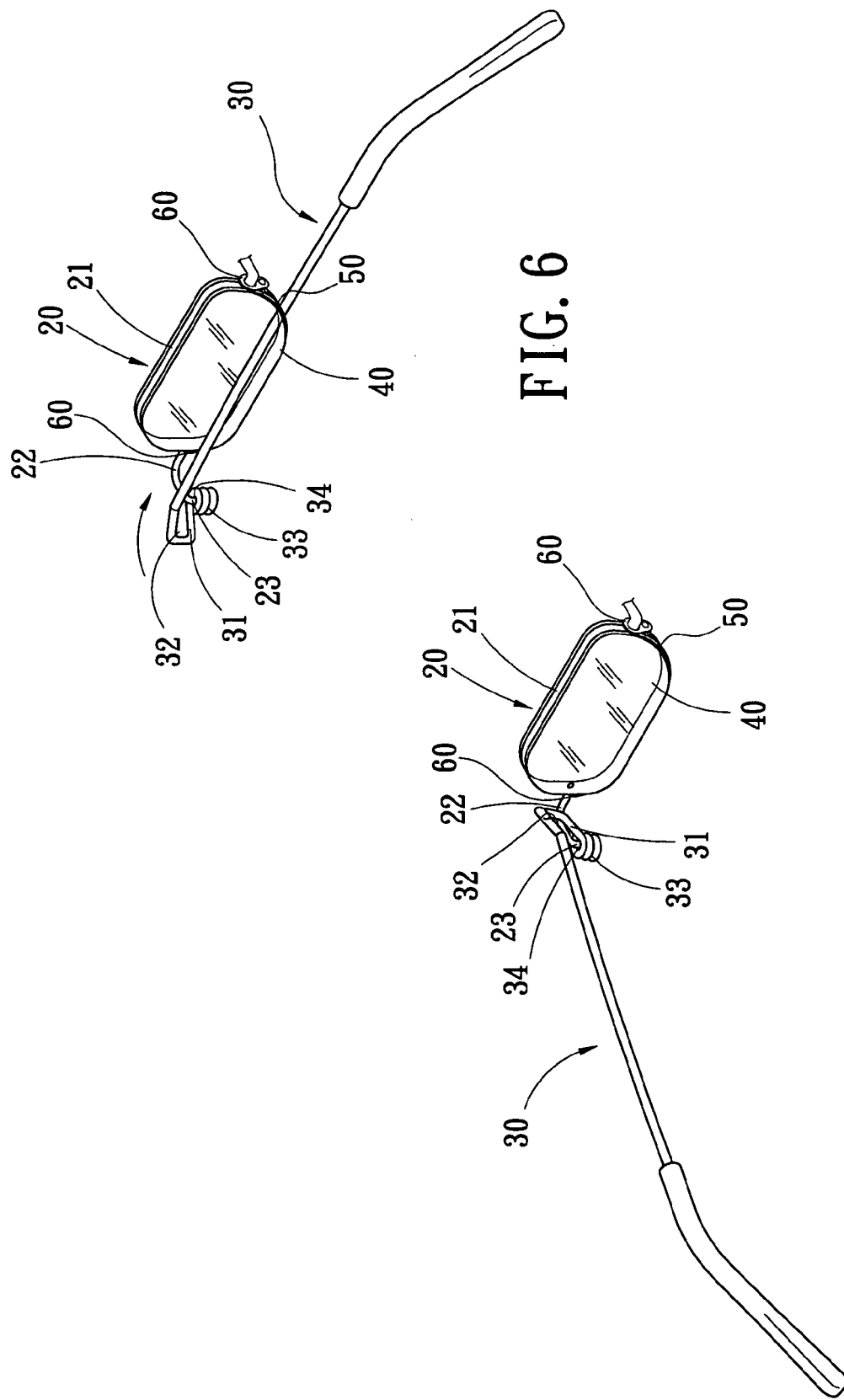

GLASSES STRUCTURE

BACKGROUND OF THE INVENTION

1. Field of the Invention

The present invention relates to a glasses structure, more particularly to a glasses structure having an integrally formed temple and an integrally formed lens frame. The temple and the lens frame are easily and directly assembled together without using screws.

2. Description of the Prior Art

A conventional glasses structure is shown in FIG. 1. The glasses structure has a lens frame 10, a curved portion 11, a temple 12 and a screw 13.

The curved portion 11 is welded to the lens frame 10, and the temple 12 is provided with an ear piece that hooks over the ear. Moreover, the temple 12 is pivotally connected to the curved portion 11 and fastened thereto by the screw 13, so that the temple 12 can be horizontally folded on the lens frame 10 when not in use or stored in a box.

In the assembly process, screwing the temple 12 to the curved portion 11 requires a lot of assembly time and production cost. Furthermore, the screw 13 is frequently stripped to cause threads of the curved portion 11 to break so that the screw 13 cannot be taken out. This results in a large amount of defective product.

According to above descriptions, the conventional glasses structure still has some issues that need to be improved.

Therefore, it is necessary to provide an improved glasses structure having a temple and a lens frame. The temple and the lens frame are easily and directly assembled together without using screws.

SUMMARY OF THE DISCLOSURE

The object of the present invention is to provide a glasses structure having an integrally formed temple and an integrally formed lens frame. The temple and the lens frame are easily and directly assembled together without using screws.

In order to achieve the above object, the present invention provides a glasses structure. The glasses structure has a lens frame and a temple. The lens frame has a curved portion disposed at a side thereof and a shaft portion downwardly extending from the curved portion. The temple has a positioning portion disposed at an end thereof, a position opening defined inside the positioning portion, a bushing portion downwardly extending from the positioning portion and a hole defined inside the bushing portion. The shaft portion of the lens frame is inserted into the hole of the temple and the curved portion of the lens frame is held in the position opening of the temple so that the temple pivots on the lens frame.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTIONS OF THE DRAWINGS

Other objects, features and advantages of the present invention will be more apparent from the following detailed description when read in conjunction with the accompanying drawings in which:

FIG. 2A is a enlarged view of the present invention.

FIG. 2B is a enlarged view of the present invention.

FIG. 3 is a top view of a temple of the present invention.

FIG. 4 is a right-side view of a temple of the present invention.

FIG. 5 is a perspective view of first step of assembly of the lens frame and the temple.

FIG. 6 is a perspective view of second step of the lens frame and the temple.

DETAILED DESCRIPTION OF THE PREFERRED EMBODIMENTS

Figure 1:
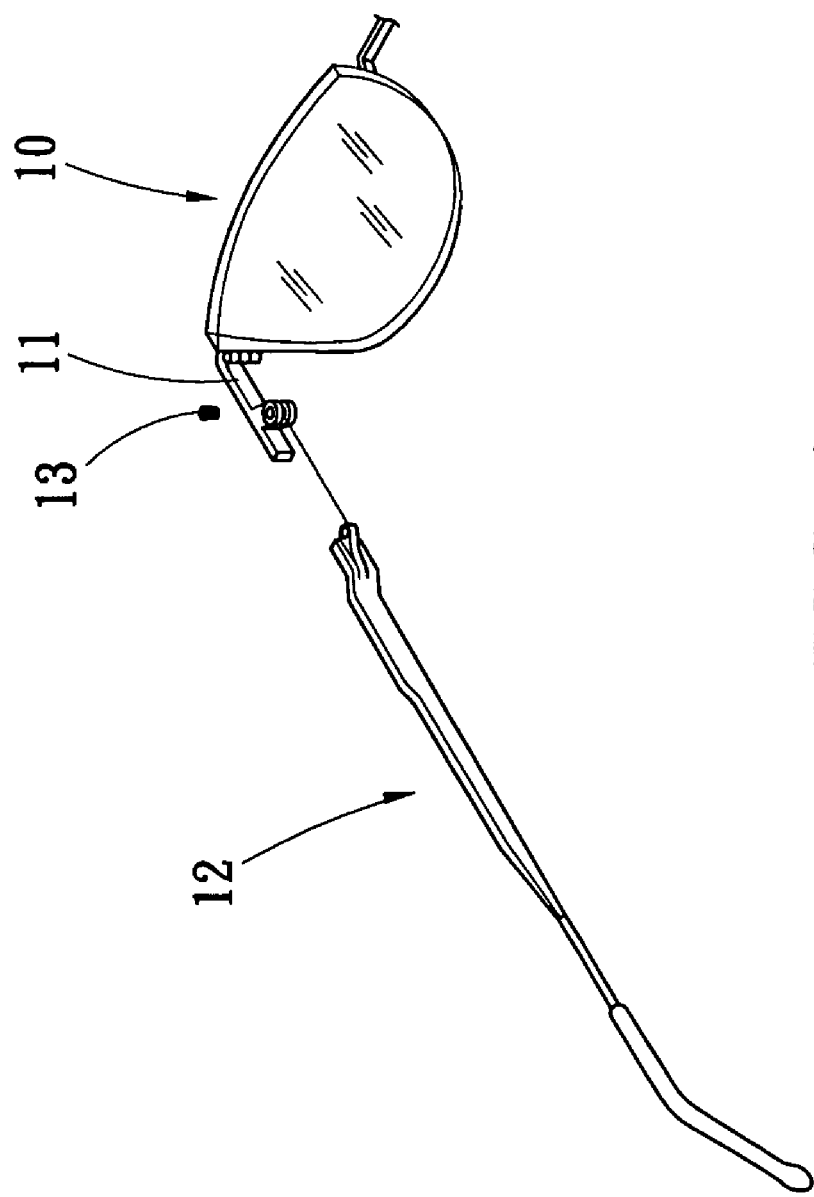
FIG. 1 is an exploded view of a conventional glasses structure.
Figure 2:
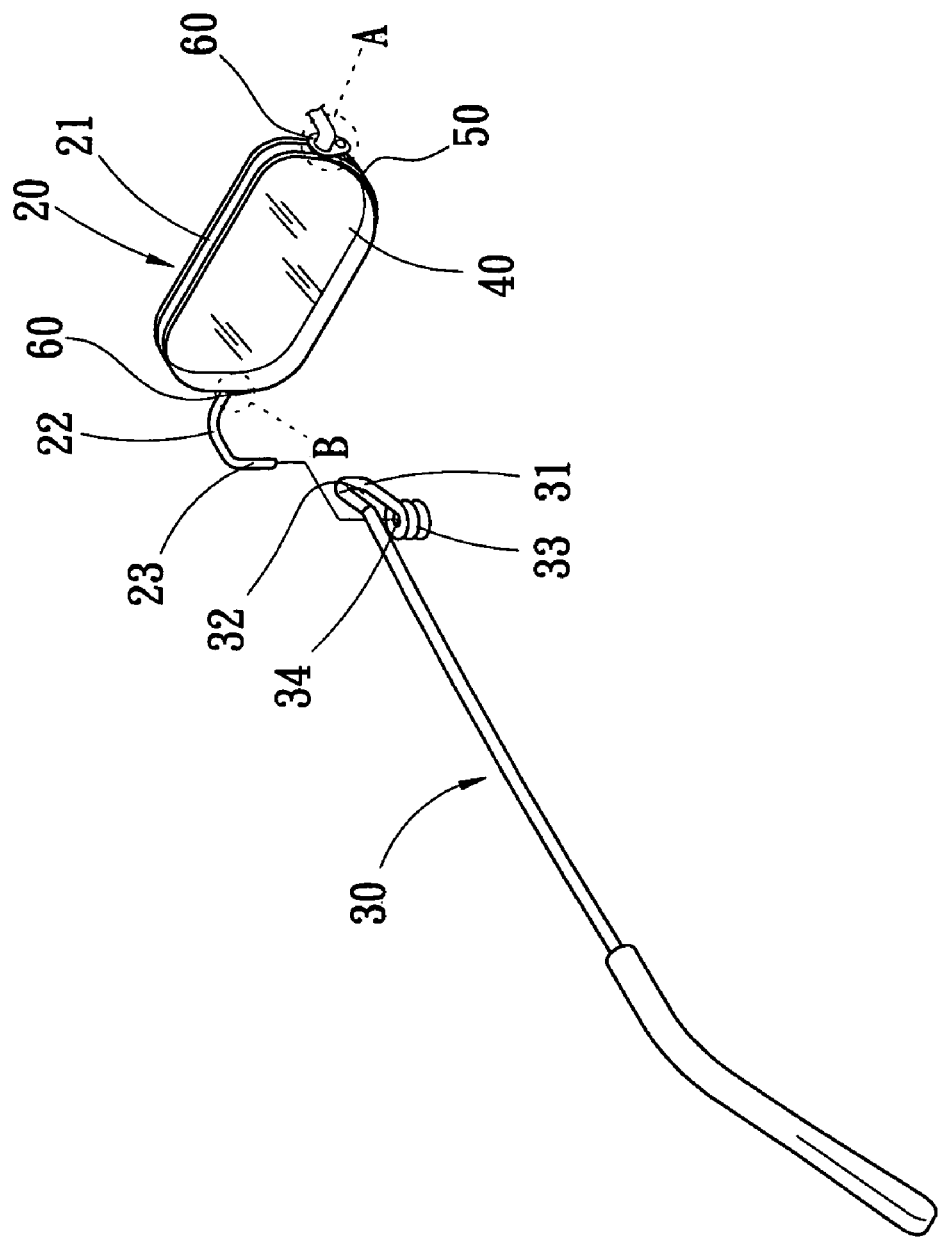
FIG. 2 is an exploded view of the present invention.

Reference is made to FIG. 2, which illustrates a glasses structure including a lens frame 20, a temple 30, a lens 40, a nylon string 50 and two slices 60.

The lens frame 20 is an integrally formed curved wire. Moreover, the lens frame 20 has a curved portion 22 disposed at a side thereof, a shaft portion 23 downwardly extending from the curved portion 22 and a lens-fixing portion 21 connecting with the curved portion 22 for fixing an upper portion of a lens. The lens 40 is fixed to the lens-fixing portion 21 of the lens frame 20. The two slices 60 are disposed at two sides of the lens 40. The nylon string 50 connects the two slices 60 along a lower portion of the lens 40, so as to fix the lens.

The temple 30 (as shown in FIG. 3 and FIG. 4) is an integrally formed curved wire. Moreover, the temple 30 has a U-shaped positioning portion 31 disposed at an end thereof, a position opening 32 defined inside the positioning portion 31, a bushing portion 33 with a spiral shape downwardly extending from the positioning portion 31 and a hole 34 defined inside the bushing portion 33. The shaft portion 23 of the lens frame 20 is inserted into the hole 34 of the temple 30 and the curved portion 22 of the lens frame 20 is held in the position opening 32 of the temple 30 so that the temple 30 pivots on the lens frame 20.

Figure 7:
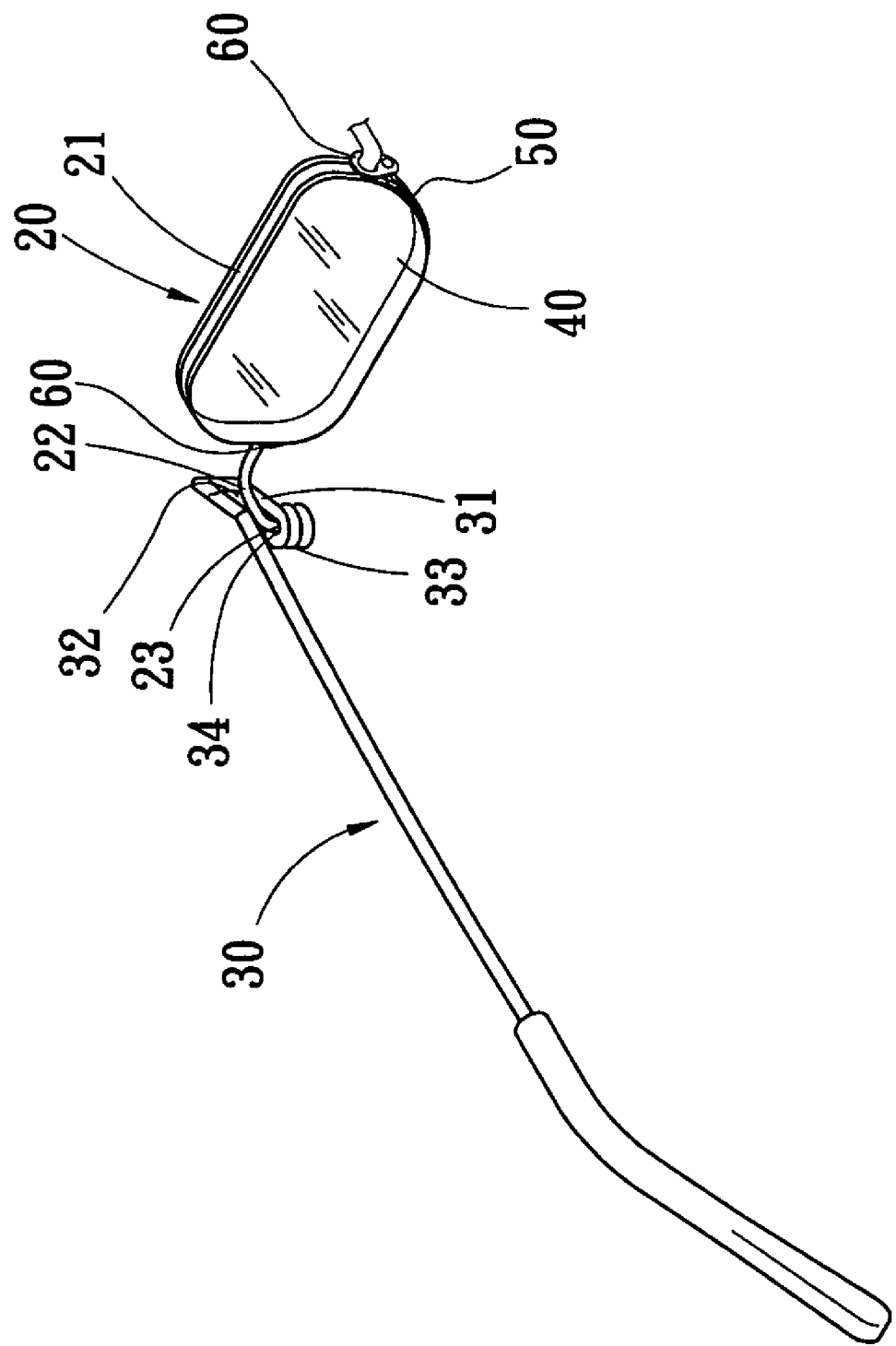
FIG. 7 is a perspective view of third step of assembly of the lens frame and the temple.

Reference is made to FIGS. 5–7 that show steps to assemble the lens frame 20 and the temple 30. The first step (as shown in FIG. 5) is to insert the shaft portion 23 of the curved portion 22 of the lens frame 20 into the hole 34 of the bushing portion 33 of the temple 30 therein. The second step (as shown in FIG. 6) is to rotate the temple 30 clockwise or counterclockwise about the shaft portion 23 of the lens frame 20 to locate the temple 30 over the curved portion 22 and the lens-fixing portion 21 of the lens frame 20. The third step (as shown in FIG. 7) rotates the temple 30 until the curved portion 22 of the lens frame 20 is held in the position opening 32 of the temple 30 so that the temple 30 pivots on the lens frame 20.

According to above descriptions, the present invention has following advantages:

(1) The temple 30 and the lens frame 20 are easily and directly assembled together without using screws.

(2) Because the assembly process eliminates a screwing step, a lot of assembly time and production costs are saved.

(3) Screws are not used, and defective products are thus avoided.

Although particular embodiment of the invention has been described in detail for purpose of illustration, various modifications and enhancements maybe made without departing from the spirit and scope of the invention.

Accordingly, the invention is not to be limited except as by the appended claims.

What is claimed is:

1. A glasses structure, comprising:
    a lens frame having a curved portion disposed at a side thereof and a shaft portion downwardly extending from the curved portion; and
        a temple having a positioning portion disposed at an end thereof, a position opening defined inside the positioning portion, a bushing portion downwardly extending from the positioning portion and a hole defined inside the bushing portion;
    wherein the shaft portion of the lens frame is inserted into the hole of the temple and the curved portion of the lens frame is held in the position opening of the temple so that the temple pivots on the lens frame.

2. The glasses structure as claimed in claim 1, wherein the lens frame is an integrally formed curved wire.

3. The glasses structure as claimed in claim 2, wherein the lens frame further has a lens-fixing portion connecting with the curved portion for fixing an upper portion of a lens.

4. The glasses structure as claimed in claim 3, wherein the glasses structure further comprises a lens fixed to the lens-fixing portion of the lens frame, two slices disposed at two sides of the lens and a nylon string connecting the two slices along a lower portion of the lens, so as to fix the lens.

5. The glasses structure as claimed in claim 1, wherein the shaft portion of the lens frame is formed as a straight shape and the hole of the bushing portion of the temple is formed as a straight shape.

6. The glasses structure as claimed in claim 1, wherein the temple is an integrally formed curved wire.

7. The glasses structure as claimed in claim 1, wherein the bushing portion of the temple has a spiral shape.

* * * * *